R. F. ROGERS.
MOTOR CYCLE SIDE CAR FRAME.
APPLICATION FILED DEC. 16, 1916.

1,247,333.

Patented Nov. 20, 1917.
2 SHEETS—SHEET 1.

Witnesses:
Robert Hwein
Arthur W. Carlson

Inventor:
Ralph F. Rogers
James R. Offield, Atty.

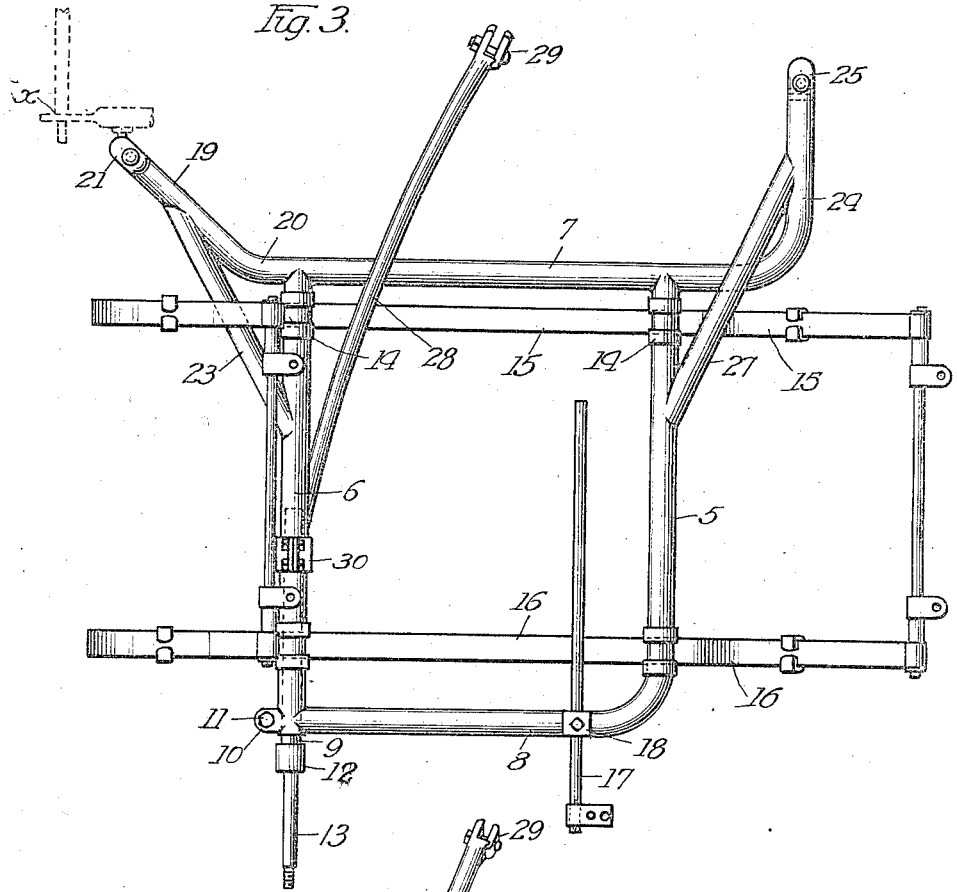
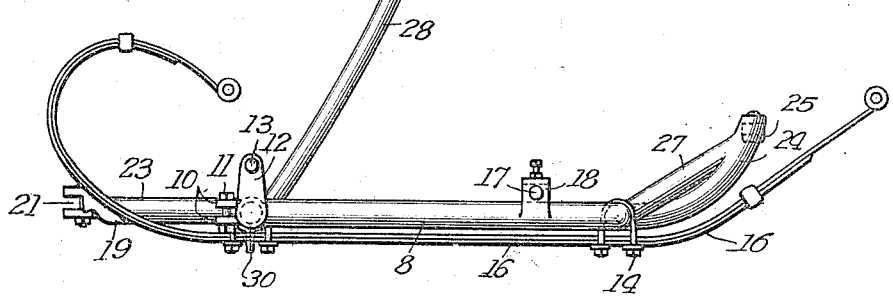

UNITED STATES PATENT OFFICE.

RALPH F. ROGERS, OF CHICAGO, ILLINOIS.

MOTOR-CYCLE SIDE-CAR FRAME.

1,247,333.  Specification of Letters Patent.  Patented Nov. 20, 1917.

Application filed December 16, 1916. Serial No. 137,236.

*To all whom it may concern:*

Be it known that I, RALPH F. ROGERS, a citizen of the United States, and a resident of Chicago, in the county of Cook and State of Illinois, have invented certain new and useful Improvements in Motor-Cycle Side-Car Frames, of which the following is a specification.

My invention relates to motorcycle side car frames and covers improved construction and arrangement thereof which will greatly increase the efficiency.

In the usual construction of side car frames the rear axle is usually positioned to be in the vertical plane of the rear axle of the motorcycle when the frame is attached. This causes more or less of a side drag on the motorcycle and the strain on the frame axle is very great and bending or breakage frequently results. Furthermore, with such prior construction the car body is not in the most advantageous and desirable position with reference to the motorcycle seat. The object of my invention is therefore to provide construction and arrangement which will increase the direct longitudinal drive component on the frame and particularly the rear axle thereof. This I accomplish by locating the frame axle a considerable distance in front of the motorcycle rear axle and connecting with diagonal braces between the side car frame and the motorcycle frame, and also by connecting with diagonal brace members from the front of the side car frame to the motorcycle frame, this arrangement introducing longitudinal push and pull components on the side car frame instead of the ordinary drag. Furthermore, the arrangement brings the center of gravity of the frame closer to the turning center of the motorcycle, and this greatly reduces strains during running of the vehicle.

On the accompanying drawings I show construction and arrangement embodying the various features of my invention. On these drawings—

Figure 1:
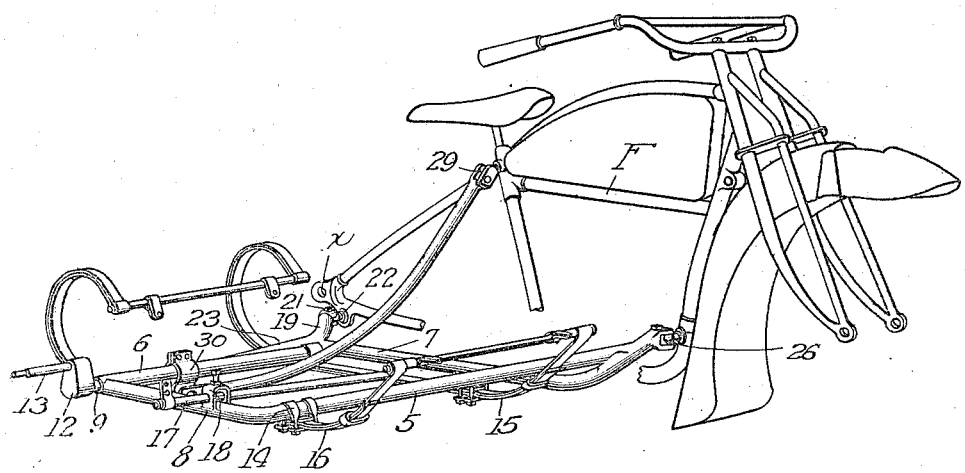
Figure 2:
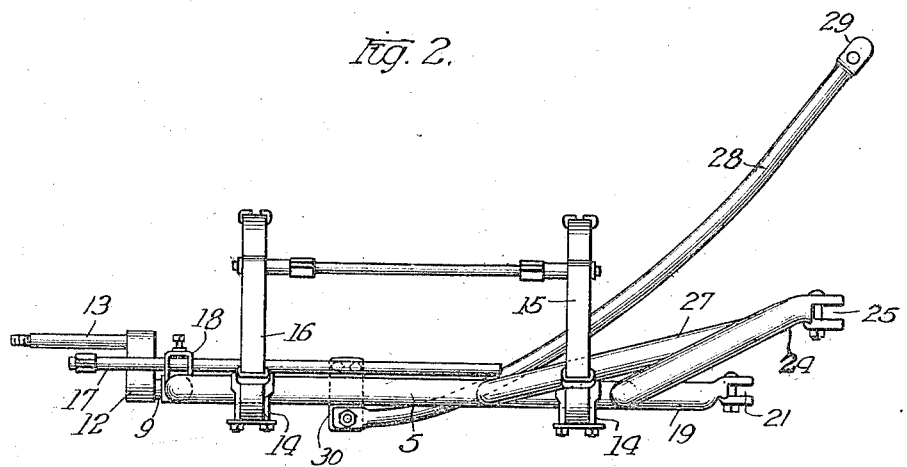

Figure 1 is a perspective view of the side car framework connected with the motorcycle frame, Fig. 2 is a front elevational view of the frame, Fig. 3 is a plan view, and Fig. 4 is a side view.

The body of the frame is rectangular and comprises the front and rear sections 5 and 6, the inner side section 7 and the outer side section 8, these sections being preferably of tubing rigidly connected together preferably by welding. The rear member 6 forms the axle member, the axle bar 9 extending therethrough and being adjustable therein and secured by means of clamping lugs 10 and the bolt 11. The bar 9 extends through the lower end of the vertical block 12 from whose upper end the outer section 13 extends to receive the side car wheel, which is not shown. Hung from the front and rear sections 5 and 6 in the usual manner by means of hangers 14 are the longitudinally extending supporting springs 15 and 16 for the car body which is not shown. The rod 17 adjustable transversely in the clamp 18 serves to secure at its outer end the mudguard for the side car wheel.

The inner side section 7 is extended a distance rearwardly of the axle section 6, its end 19 beyond the bend 20 extending diagonally rearwardly and laterally and at its end has socket jaws 21 for receiving the ball 22 detachably secured to the frame F of the motorcycle a distance in front of the rear axle $x$, this arrangement and connection bringing the axle section 6 of the side car frame a considerable distance in front of the vertical plane of the motorcycle axle and introducing a considerable longitudinal push component on the frame during travel. To strengthen and stiffen the rear axle section and to extend the application of the push component toward the center of the axle section a diagonal brace member 23 is secured to the axle section and the diagonal end 19. With this arrangement, when the motorcycle is traveling the longitudinal drive component will be distributed to the frame side section 7 and to the axle section near its center, and the tendency will be to prevent bending and breakage of the axle section and to keep it perpendicular to the motorcycle frame.

At its front end the frame side section 7 is extended a distance forwardly of the front section 5, its end 24 being gradually bent to be at right angles with the frame and terminating in socket jaws 25 for receiving the ball 26 supported from the motorcycle frame. The diagonal brace 27 connects the end 24 with the front section 5 of the frame. This arrangement causes the longitudinal pull component to be directed well toward the center of the side car frame and also greatly strengthens the frame and prevents dragging flexure thereof. 28 represents a flexible brace which at one end has the ball and socket connection 29 with the top of the motorcycle frame well in front of the axle, and whose rear end is pivoted to clamp 30 secured to the axle section 6 of the side car. This brace by extending diagonally forwardly from the axle section 6 and being secured thereto near its outer end introduces additional longitudinal pull component which greatly strengthens the axle section against bending. This brace is bowed downwardly to clear the under side of the car body and also to permit spring action, the flexibility being just sufficient to relieve the motorcycle of all lateral vibration but the brace being sufficiently rigid to eliminate side sway. This brace also serves to hold the motorcycle up when it is at rest.

The frame construction of my invention has been found to be very efficient. The rear axle is well in advance of the motorcycle driving axle and the positive longitudinal push and pull components are distributed by the diagonal brace members and the flexible brace along and well toward the outer side of the frame, this greatly relieving both the side car supporting frame and the motorcycle frame of stresses and strains. Furthermore, the center of gravity of the frame is brought much closer to the turning center of the motorcycle which obviously decreases stresses and strains and permits the motorcycle to be more easily controlled. The arrangement also brings the seat of the car body well alongside or in front of the motorcycle driver, this being very desirable.

I do not, of course, desire to be limited to the exact construction and arrangement shown and described as modifications are no doubt possible which would still come within the scope of the invention.

I claim as follows:

1. In a side car supporting frame, the combination of an inner side section adapted at its front and rear ends for connection with the front and rear ends of a motor cycle frame, an axle section extending laterally from said inner side section in a plane a considerable distance in advance of the rear end of said inner side section, and a brace extending diagonally from said axle section toward said rear end of said side section.

2. In a side car supporting frame, the combination of an inner side section, an axle section extending outwardly therefrom, the rear end of said side section deflecting diagonally rearwardly and away from said axle section and adapted at its end for connection with the frame of a motorcycle, a brace connecting with said axle section and with said diagonally extending end of the side section, the front end of said side section being adapted for connection with the motorcycle frame.

3. In a side car supporting frame, the combination of an inner side section, an axle section extending outwardly therefrom, the rear end of said side section deflecting diagonally rearwardly and away from said axle section and adapted at its end for connection with the frame of a motorcycle, a brace connecting with said axle section and with said diagonally extending end of the side section, the front end of said side section being deflected laterally and adapted for connection with the motorcycle frame, a front frame section extending outwardly from said side section and connected at its outer end with said axle section, and a brace secured to said front frame section and to the deflected front end of said inner side section.

4. The combination with a motorcycle, of a side car frame pivotally connected therewith at the lower part thereof, an axle forming part of said frame to extend at right angles with the motorcycle frame, a brace having universal pivot connection at its front end with the upper part of said motorcycle frame and pivoted at its rear end to the side car axle near the center thereof, said brace being vertically bowed to act as a bow spring, the flexibility of said brace being just sufficient to relieve the motorcycle of all lateral vibration but said brace being sufficiently rigid to eliminate side sway.

In witness whereof I hereunto subscribe my name this 12th day of December, A. D., 1916.

RALPH F. ROGERS.